US009514595B2

(12) United States Patent
Agon et al.

(10) Patent No.: US 9,514,595 B2
(45) Date of Patent: Dec. 6, 2016

(54) BEVERAGE PREPARATION MACHINE WITH AMBIENCE EMULATION FUNCTIONALITY

(75) Inventors: Fabien Ludovic Agon, Le Bouveret (CH); Marc Delbreil, Bulle (CH)

(73) Assignee: Nestec S.A., Vevey (CH)

( * ) Notice: Subject to any disclaimer, the term of this patent is extended or adjusted under 35 U.S.C. 154(b) by 138 days.

(21) Appl. No.: 13/513,767

(22) PCT Filed: Nov. 29, 2010

(86) PCT No.: PCT/EP2010/068360

§ 371 (c)(1), (2), (4) Date: Jun. 4, 2012

(87) PCT Pub. No.: WO2011/067188

PCT Pub. Date: Jun. 9, 2011

(65) Prior Publication Data

US 2012/0240778 A1 Sep. 27, 2012

(30) Foreign Application Priority Data

Dec. 2, 2009 (EP) .................................... 09177735

(51) Int. Cl.

| | |
|---|---|
| ***G07F 17/16*** | (2006.01) |
| ***G06F 3/042*** | (2006.01) |
| ***A47J 31/44*** | (2006.01) |
| ***G07F 9/02*** | (2006.01) |
| ***G07F 13/02*** | (2006.01) |
| *G06F 3/048* | (2013.01) |

(52) U.S. Cl.

CPC ............ *G07F 9/026* (2013.01); *A47J 31/4492* (2013.01); *G07F 13/02* (2013.01); *G07F 17/16* (2013.01); *G06F 3/048* (2013.01)

(58) Field of Classification Search

CPC ........ G06F 3/048; G07F 17/16; A47J 31/4492
USPC .......................................................... 235/381
See application file for complete search history.

(56) References Cited

U.S. PATENT DOCUMENTS

| | | |
|---|---|---|
| 4,377,049 A | 3/1983 | Simon |
| 4,458,735 A | 7/1984 | Houman |
| 4,554,419 A | 11/1985 | King |
| 4,767,632 A | 8/1988 | Meier |

(Continued)

FOREIGN PATENT DOCUMENTS

| | | |
|---|---|---|
| AT | 413077 | 4/2003 |
| AU | 633758 B2 | 2/1993 |

(Continued)

OTHER PUBLICATIONS

Written Opinion and International Search Report issued Mar. 15, 2011 for corresponding Intl. Appln. No. PCT/EP2010/068360.

*Primary Examiner* — Toan Ly

(74) *Attorney, Agent, or Firm* — K&L Gates LLP

(57) ABSTRACT

The present invention relates to a beverage preparation machine with ambience emulation functionality. A providing arrangement (11, 21, 17) provides data with visible 5 content for generating a predefined ambience when reproduced, wherein the provided data are linked to context information, said context information being indicative of a situation. An acquisition arrangement (11, 37, 60, 62, 63) acquires at least one actual context 10 information indicating an actual situation, and a display (10) reproduces data being associated to the acquired actual context information for generating an ambience related to the actual situation.

10 Claims, 5 Drawing Sheets

(56) References Cited

U.S. PATENT DOCUMENTS

| | | | | |
|---|---|---|---|---|
| 4,954,697 | A | 9/1990 | Kokubun | |
| 5,335,705 | A | 8/1994 | Morishita | |
| 5,372,061 | A | 12/1994 | Albert | |
| 5,375,508 | A | 12/1994 | Knepler | |
| 5,619,619 | A | 4/1997 | Shinohara et al. | |
| 5,645,230 | A | 7/1997 | Marogna | |
| 5,731,981 | A | 3/1998 | Simard | |
| 5,836,236 | A | 11/1998 | Rolfes | |
| 5,959,869 | A | 9/1999 | Miller | |
| 6,182,555 | B1 | 2/2001 | Scheer | |
| 6,312,020 | B1 | 11/2001 | Ketcham | |
| 6,315,197 | B1 | 11/2001 | Beardsley | |
| 6,354,341 | B1 | 3/2002 | Saveliev | |
| 6,759,072 | B1 * | 7/2004 | Gutwein et al. | 426/433 |
| 8,037,811 | B2 | 10/2011 | Bunn | |
| 2002/0161476 | A1 * | 10/2002 | Panofsky et al. | 700/231 |
| 2004/0032421 | A1 * | 2/2004 | Williamson et al. | 345/704 |
| 2004/0133466 | A1 * | 7/2004 | Redmond et al. | 705/14 |
| 2004/0166937 | A1 | 8/2004 | Rothschild et al. | |
| 2005/0011205 | A1 * | 1/2005 | Holmes et al. | 62/156 |
| 2006/0231613 | A1 | 10/2006 | Walker et al. | |
| 2006/0281543 | A1 | 12/2006 | Sutton et al. | |
| 2007/0157821 | A1 * | 7/2007 | Panesar et al. | 99/279 |
| 2011/0108162 | A1 * | 5/2011 | Yoakim | A47J 31/52 141/94 |

FOREIGN PATENT DOCUMENTS

| | | | | |
|---|---|---|---|---|
| DE | 4429353 | A1 | 2/1996 | |
| DE | 20200419 | U1 | 7/2002 | |
| DE | 202006019039 | U1 | 4/2007 | |
| EP | 0872808 | A1 | 10/1998 | |
| EP | 1302138 | A2 | 4/2003 | |
| EP | 1448084 | A1 | 8/2004 | |
| EP | 1676509 | A1 | 7/2006 | |
| FR | 2624844 | A1 | 6/1989 | |
| GB | 2397510 | | 7/2004 | |
| JP | 2002099684 | | 4/2002 | |
| WO | 99/50172 | | 10/1999 | |
| WO | 03/102884 | A1 | 12/2003 | |
| WO | 2004/030435 | A2 | 4/2004 | |
| WO | 2004/030438 | A2 | 4/2004 | |
| WO | 2006/063645 | A1 | 6/2006 | |
| WO | 2006/090183 | A2 | 8/2006 | |
| WO | 2007/003062 | A1 | 1/2007 | |
| WO | 2008/104751 | A1 | 9/2008 | |
| WO | 2008138710 | A1 | 11/2008 | |
| WO | 2008138820 | A1 | 11/2008 | |
| WO | WO 2009016490 | A2 * | 2/2009 | 221/1 |
| WO | 2007/003990 | A2 | 1/2011 | |

* cited by examiner 22
40
12
45
6
35
34
1

23
42
12
10
15

BEVERAGE PREPARATION MACHINE WITH AMBIENCE EMULATION FUNCTIONALITY

CROSS REFERENCE TO RELATED APPLICATIONS

The present application is a National Stage of International Application No. PCT/EP2010/068360, filed on Nov. 29, 2010, which claims priority to European Patent Application No. 09177735.9, filed on Dec. 2, 2009, the entire contents of which are being incorporated herein by reference.

FIELD OF THE INVENTION

The field of the invention relates to a beverage preparation machine with ambience emulation functionality and to a program stored on a memory device and executable by a control unit of a beverage preparation machine.

For the purpose of the present description, a "beverage" is meant to include any liquid food, such as tea, coffee, hot or cold chocolate, milk, soup, baby food or the like. A "capsule" is meant to include any pre-portioned beverage ingredient within an enclosing packaging of any material, in particular an air tight packaging, e.g. plastic, aluminum, recyclable and/or bio-degradable packaging and of any shape and structure, including soft pods or rigid cartridges containing the ingredient.

BACKGROUND ART

Certain beverage preparation machines use capsules containing ingredients to be extracted or to be dissolved; for other machines, the ingredients are stored and dosed automatically in the machine or else are added at the time of preparation of the drink.

Most coffee or other beverage preparation machines possess filling means that include a pump for liquid, usually water, which pumps the liquid from a source of water that is cold or indeed heated through heating means, such as a heating resistor, a thermoblock or the like. Such filling means are usually controlled via a control unit of the machine, typically including a printed circuit board with a controller.

For allowing the user to interact with such machines, for providing operation instructions to the machine or obtaining feed-back therefrom, various systems have been disclosed in the art, for instance as mentioned in the following references: AT 410 377, CH 682 798, DE 44 29 353, DE 202 00 419, DE 20 2006 019 039, DE 2007 008 590, EP 1 302 138, EP 1 448 084, EP 1 676 509, EP 08155851.2, FR 2 624 844, GB 2 397 510, U.S. Pat. No. 4,377,049, U.S. Pat. No. 4,458,735, U.S. Pat. No. 4,554,419, U.S. Pat. No. 4,767,632, U.S. Pat. No. 4,954,697, U.S. Pat. No. 5,312,020, U.S. Pat. No. 5,335,705, U.S. Pat. No. 5,372,061, U.S. Pat. No. 5,375,508, U.S. Pat. No. 5,731,981, U.S. Pat. No. 5,645,230, U.S. Pat. No. 5,836,236, U.S. Pat. No. 5,959,869, U.S. Pat. No. 6,182,555, U.S. Pat. No. 6,354,341, U.S. Pat. No. 6,759,072, US 2007/0157820, WO 97/25634, WO99/50172, WO 2004/030435, WO 2004/030438, WO 2006/063645, WO 2006/090183, WO 2007/003062, WO 2007/003990, WO 2008/104751, WO 2008/138710, WO 2008/138820 and WO 2009/016490.

Today's beverage preparation machines provide an increasing number of different functions and correspondingly provide an increasing number of indications regarding the functionality of the machine. For example, warning lights or beeping sounds usually are foreseen to indicate to the customer a malfunction, a missing ingredient or the like.

The beverage preparation machines thus are very functional and electronical, which is rather annoying for the customer. Known beverage preparation machines thus suffer from the disadvantage that they are not in conformity with modern lifestyle.

SUMMARY OF THE INVENTION

It is therefore an object of the present invention to improve the prior art.

It is a preferred object of the present invention to provide a beverage preparation machine with ambience emulation functionality, which allows an adaptation of the machine display to the actual situation. More specifically, it is an object of the present invention to provide such a machine, so that not the functionality of the machine as such is emphasized anymore but rather the aspect of a device being a benefit for lifestyle, ambience and furnishing. More specifically, it is an object of the present invention to provide such a machine, being a benefit for lifestyle, ambience and furnishing, in particular when the user uses its machine to prepare a beverage at home, or more generally speaking, in a household environment or non public environment.

According to a first aspect the present invention relates to a beverage preparation machine with ambience emulation functionality, comprising a providing arrangement for providing data with visible content for generating a predefined ambience when reproduced, wherein the provided data are linked to context information, said context information being indicative of a situation, an acquisition arrangement for acquiring at least one actual context information indicating an actual situation, and a display for reproducing data being associated to the acquired actual context information for generating an ambience related to the actual situation.

The present invention further relates to a program stored on a memory device and executable by a control unit of a beverage preparation machine for providing ambience emulation functionality, wherein said program when being executed is arranged to perform the steps of providing data with visible content for generating a predefined ambience when reproduced, wherein the provided data are linked to context information, said context information being indicative of a situation, acquiring at least one actual context information indicating an actual situation, and reproducing via a display data being associated to the acquired actual context information for generating an ambience related to the actual situation.

This program for providing ambience emulation functionality comprise electronic data-processing program code instructions, intended to be executed by a processing unit such a processor or a controller. Consequently, the invention relates also to programs on an information support, for providing ambience emulation functionality. These programs may use any programming language, and may be in the form of source code, object code, or intermediate code between source code and object code, such partially compiled code, or any suitable other form.

The invention relates also to an information support readable by a beverage machine, and on which are stored instructions of the programs as mentioned above. The information support may be any suitable device capable of storing said programs. For example, it may comprise storage means, comprising a CD-ROM, USB key, FLASH memories, or a ROM of a microelectronic circuit, or a magnetic storing means, like a floppy or hard drive. Moreover, the information support may be a transmissible support, such as an electrical or optical signal, which can be transported by an optical or electrical wire, by radiofrequency means or by any suitable coupling means. The program may be in particular downloaded from a network connected to Internet.

The information support may also be an integrated circuit in which the programs are incorporated, the circuit being adapted to execute or to be used to execute this program.

Further features, advantages and objects of the present invention will become evident by means of the Figures of the enclosed drawings as well as by the following detailed explanation of illustrative-only embodiments of the present invention.

BRIEF DESCRIPTION OF THE DRAWINGS

The invention will now be described with reference to schematic drawings, wherein.

DETAILED DESCRIPTION

Figure 1B:
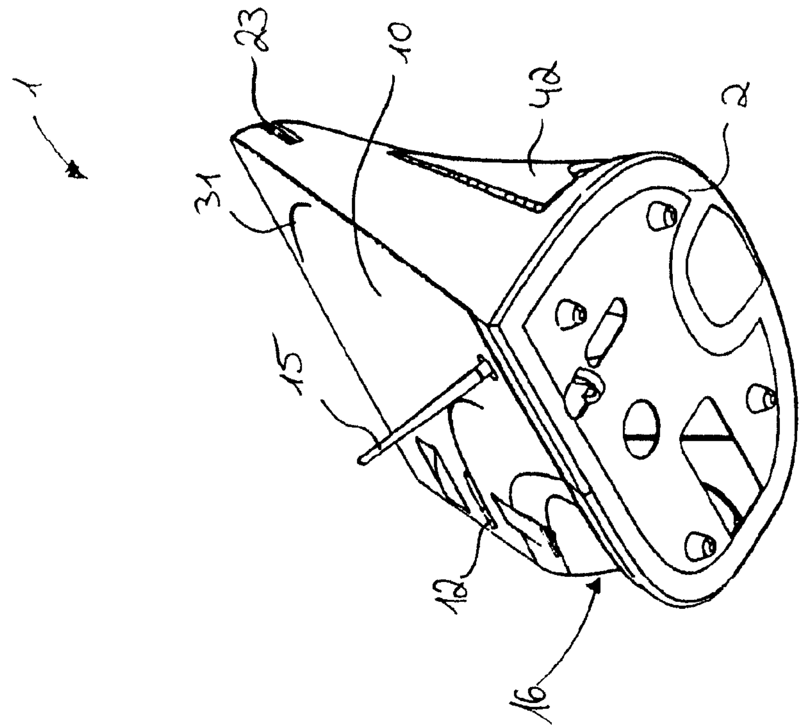
FIGS. 1*a*, 1*b*, 2*a* and 2*b* show different perspective views of a beverage preparation machine according to the present invention.

The machine according to the present invention can be a coffee, tea or soup machine, in particular a machine for supplying a beverage or liquid food by passing hot or cold water or another liquid through a capsule containing an ingredient of the beverage or liquid food to be supplied, such as ground coffee.

For example, the preparation machine comprises: an ingredient processing arrangement including one or more of a liquid reservoir, liquid circulation circuit, a heater, a pump and a beverage preparation unit arranged to receive capsules for use and evacuate capsules upon use; a housing having an opening leading into a seat to which capsules are evacuated from the preparation unit; and a receptacle having a cavity forming a storage space for collecting capsules evacuated to the seat into the receptacle to a level of fill. The receptacle is insertable into the seat for collecting capsules and is removable from the seat for emptying the collected capsules. Examples of such ingredient processing arrangements are disclosed in WO 2009/074550 and in WO 2009/130099, which are incorporated herein by reference.

The machine may include an interface as described in PCT/EP09/058,540 and/or be in a network for reordering capsules as described in EP 09169800.1.

The machine may comprise a user-interface screen for providing information to the user and/or for accepting input by the user. The user-interface screen can be a touch-sensitive screen and/or comprise touch-sensitive input parts. The machine may have a user-input device, such as a touch pad, one or more buttons and/or switches or similar devices known in the art. The user-interface screen can be stylus sensitive.

A stylus may for instance be used to select predefined options displayed on the interface-screen or to write notes and messages on the user-interface screen that may be stored by the machine and re-accessible later. Hence, the screen may be used as a substitution for a post-it. Hereby, it may be possible to select different colors when writing on the screen.

According to the present invention, the liquid food or beverage preparation machine has an interface for connection to a remote network, such as a network for accessing remote data displayable on the user-interface screen and/or for transferring local data acquired via the user interface screen, in particular a network for: supplying visual and/or audio information in relation with a liquid food or beverage that can be requested by the user; and/or for ordering, in particular from a remote supplier, goods such as liquid food or beverage ingredients or a service related to this machine by using the user-interface screen.

Hence, the user may be given the technical possibility to order directly through the beverage preparation machine liquid food or beverage ingredients that are missing or at a low level, or request directly through this machine the most up to date information on a particular item, in particular a liquid food or beverage he has requested or intends to request the machine to prepare or order from the supplier.

Moreover, the user-interface screen can be arranged to perform at least one function selected from: displaying information to the user regarding a parameter of the machine that requires a user intervention, displaying locally stored and/or remotely emitted graphic or text matter, a notepad function, and a visual ambiance generator, for instance by displaying appropriate pictures or moving colour shapes, for instance of the screen-saver type.

In order to noticeably affect the ambiance surrounding the machine by visual effects, the user-screen has to dominate the user-visible part of the machine. An interface screen of small size and/or lost somewhere on the user-visible part of the machine will not provide an optimal ambiance effect.

Figure 1A:
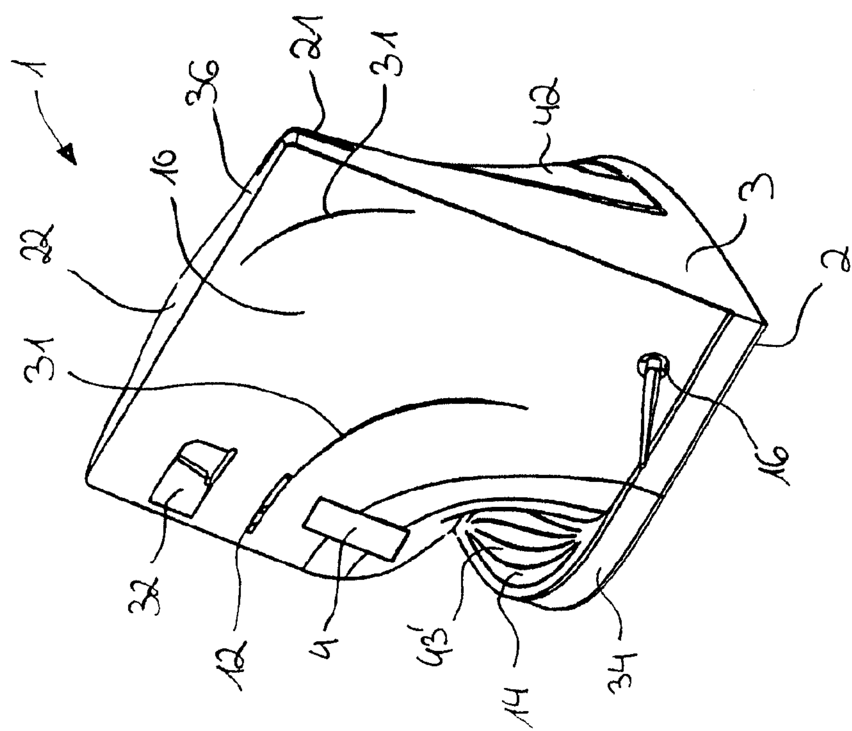

In an embodiment, the user-interface screen is rendered dominating by disposing it on the housing as described hereinafter, and as illustrated by FIGS. 1*a*, 1*b*. The housing has a user-orientation for a user. The user-orientation is so arranged that said user has a normal direction of vision that is generally orthogonal to the user-interface screen and intercepts a central part thereof when said user normally requests dispensing of said liquid food or beverage. The user screen is arranged in this user-orientation to face said user within a user-visible housing portion that is delimited by user-visible outermost boundaries of said housing. In this user-orientation, the user screen forms:

- substantially the entire user-visible housing portion or a surface-predominant section thereof; or
- a majority section predominant over a plurality of distinctively user-visible sections that form together the user-visible housing portion.

Furthermore, the liquid food or beverage preparation machine may include a sound input and/or output device. The sound device can be arranged to cooperate with the user-interface screen, in particular a sound device arranged to cooperate functionally with the screen, such as a sound device for providing melodic acoustic feed back in reaction to a user-input on the user-interface screen and/or cooperating with the screen so that harmonious visual feed-back is generated on the user-interface screen in reaction to an audio signal. The sound device may include a voice recognition arrangement so as to be able to receive vocal user-commands and/or to link a particular user profile from a voice analysis.

For example, the user-interface screen may be arranged to display a movie, news, weather forecast, stock exchange information or anything alike while the machine is preparing a liquid food or beverage, so that the user does not have to wait until the liquid food or beverage is prepared to move on to such activities but can do them right from the beginning, with a comfortable interface screen whose functionalities go significantly beyond mere input and/or output of data.

Such liquid food or beverage preparation machines are particularly handy for preparing a liquid food or beverage during an on-going broadcasted radio or TV program. The user may thus get himself a liquid food or beverage while he is following such a program on an ordinary TV or radio and still continue to follow the program on the beverage preparation machine. Hence, the user will not be attempted to wait the end of the program or an advertising break. The beverage preparation machine may include a receiver that is capable of reacting to a remote control device, such as an IR or radio remote control device, in particular a remote control device compatible with a radio or television, so that the user may start-up the food or beverage preparation machine from a distance, in particular while he is sitting in front of his TV or nearby the radio. The liquid food or beverage preparation machines may of course be connected to a DVD or other media source so that the user can follow his favourite programs while he is preparing a liquid food or beverage.

The machine can be substantially formed by a main body having a rectangular front side being dominated by the user-interface screen and a foot portion larger than the top portion, so that the main body is tapering from the foot portion to the top portion. The main body may include at least one of: a drip tray having a support member for a receptacle to be filled with a liquid food or beverage, a capsule collector, and a liquid supply reservoir such as a water reservoir.

Moreover, the machine may have a liquid food or beverage outlet located above an area for receiving a receptacle to be filled, the outlet preferably being hidden by the user-interface screen. For instance, the outlet is located perpendicularly behind the user-interface screen. In fact, the entire area or a substantial part thereof can be located perpendicularly behind the user-interface screen.

Thus, in addition of providing a user-interface screen configuration on the machine that naturally and durably captures the user's attention, the machine's outlet, and optionally the receptacle located thereunder, may be hidden from the user's visual field so as avoid distraction of the user's attention by parts and/or operations of the machine other than those relating to the user-interface screen.

As already mentioned, the present invention relates to a machine connectable to a data-exchange network, the machine being configured for preparing a beverage in particular from a pre-portioned beverage ingredient in a capsule.

For this purpose, the machine comprises a communication module for connecting the machine to said network via a wired or wireless connection. The network to which the communication module is connectable may be the internet, an intranet, GSM network, UMTS network, Bluetooth network, infrared (IR) or a similar network to which one or more distant computers, servers and terminals are connected for communicating with the communication module of the beverage preparation machine. Hereby, the term "network" is intended to refer to a system comprising the machine according to the present invention and at least one further device, which are connected to each other via a communication link for one-directional or bi-directional communication. In case that a connection to more than one device is provided, the machine can also be connected to different devices via different types of communication networks.

Without controlling or participating to the control of the ingredient processing arrangement, the communication module may be configured in the beverage preparation machine to monitor certain aspects of the machine and, in particular, communicate such aspects onto the network to a remote server.

The machine further comprises a control unit for controlling all processes within the machine. In one embodiment, the control unit is arranged to communicate data to the communication module, the data relating to at least one of: the beverage preparation process; the ingredient processing arrangement; the control unit and/or beverage preparation settings. This information may then be communicated (or not) to a distant server and be processed for general or particular commercial or servicing or repair or counseling purpose.

In an even safer embodiment, the control unit is prevented from communicating with the communication module. In this case, the communication is not even unidirectional like above but inexistent. Hence, the control unit is configured to receive no signal at all from the communication module not even a signal for an information request. In this embodiment, no data communication channel is needed between the control unit and the communication module.

Typically, the ingredient processing arrangement comprises one or more sensors for measuring parameters of the status of the ingredient processing arrangement and/or the beverage preparation process. For instance, such sensors may include at least one of: temperature sensors, a pressure sensor, a flowmeter, an electric power sensor, an overheat sensor, a scale sensor, a water level sensor, an ingredient recognition sensor, etc. . . . Such sensors are usually connected to the control unit.

In an embodiment, the communication module can be arranged to receive information from at least one of the sensor(s). The communication module may be directly connected to the sensors, usually in parallel to the control unit, or it may be indirectly connected to the sensor(s) via the control unit and typically be communicated a sensor-related information after processing by the control unit.

Normally, the control unit is connected to a beverage preparation user-interface. The user would use this user-interface to operate the ingredient processing arrangement via the control unit.

Typically, the communication module is connected to a communication user-interface. The user would use this user-interface to retrieve information from the network or retrieve information therefrom.

Such user-interfaces may include screens and touch screens, buttons, switches, etc. . . . as known in the art.

Preferably, the control unit is connected to a beverage preparation user-interface and the communication module is connected to a communication user-interface, the beverage preparation user-interface and the communication user-interface being juxtaposed. In particular, the beverage preparation user-interface can be flush with the communication user-interface. The beverage preparation user-interface and the communication user-interface may be disposed in a single user-interface canvas. Hence, the disposition of the user-interfaces may be such as to appear like a single interface providing all the user-access to the control unit and the communication module.

Whereas the control unit and the communication module may be digitally and/or physically, entirely or partly, separated within the machine, the corresponding user-interfaces may be configured as an apparent single interface. Hence, the user is confronted with a single or concentrated user-interface arrangement to avoid the dispersion of his/her attention all over the beverage preparation machine.

Typically, the beverage preparation machine comprises a housing for housing: the ingredient processing arrangement; the control unit; and the communication module. This housing would normally also bear the user-interfaces.

For instance, the communication module is arranged to receive from the network and communicate via user-communication means, such as a display and/or loudspeaker, information relating to at least one of: a need to carry out a particular service; a need to repair said machine; and information on a particular ingredient that is being processed in said machine. When the communication module is configured to monitor the machine operation and/or components of the machine, the corresponding information may be communicated to a distant server of the network for evaluation and generation of suggestions to the user, for instance, via the communication module. For example, via appropriate sensor systems, the communication module may monitor the ingredient consumption and suggest timely reordering when the stock of ingredient is low or send general information regarding the ingredient or beverage that is being processed for display on the machine. Instead of a mere suggestion to reorder ingredients, e.g. proportioned ingredients capsules, the system may be configured to proceed to automatic re-ordering when the ingredient stock is low.

The communication module may be arranged for remote monitor of the service periods, for instance for carrying out a descaling process or for general maintenance. The communication module may communicate various parameters of the ingredient processing arrangement and the control unit for diagnosis purposes and/or for carrying out a market survey as to the user's preferences, for instance the actually used ratios of different ingredients. Hence, a distant server may monitor the preferred volume of beverage dispensing with certain ingredients, etc. . . .

More generally, the communication module may be arranged to receive from the network and communicate via user-communication means, such as a display and/or loudspeaker, information relating to: handling of this type of machine by a user, e.g. provide an on-line user manual and/or beverage recipes; advertising relating to beverage preparation machines, accessories, one or more ingredients that are being processed or related products; general information relating to one or more ingredients for the beverage processing; and visualization and/or music for generating an ambiance relating to such beverages or preparations thereof or consumptions thereof; and news and/or weather forecast, etc. . . . For example the communication module with the appropriate user-interface may be configured to permit distant ordering of ingredients via the network.

The beverage preparation machine can be arranged to automatically monitor the capsule consumption and send a capsule order to the supplier server whenever the automatic monitoring indicates a reaching of a shortage of consumable ingredient capsules at the customer location, the supplier server being arranged to receive the capsule order and to generate a corresponding instruction to prepare a shipment of a new stock of capsules for supply to the customer.

The beverage preparation machine may be arranged to communicate automatically the capsule consumption to the supplier server that is arranged to automatically monitor the capsule consumption and to generate the above instruction.

The machine's capsule extraction unit can be arranged to receive different types of ingredient capsules for preparing different beverages. For example, the extraction unit is arranged for receiving different coffee capsules types selected from capsules of arabica, robusta, canefora, etc. . . . and blends thereof, e.g. the NESPRESSO™ capsule ranges of capsule types, of the in-home or the out-of-home beverage preparation machine standards.

In an embodiment, the beverage preparation machine has an automatic capsule recognition arrangement.

For example, the capsule recognition system is of the type disclosed WO02/28241 which discloses a coffee machine using capsules with a machine interpretable feature that can be read automatically by the machine via a sensor. The machine interpretable feature on the capsule may include one or more of a colour, a shape, a glyph, a text string a barcode, a digital watermark, symbols, notches, grooves or holes.

For instance, the capsule extraction unit is arranged to receive different types of ingredient capsules for preparing different beverages, the automatic capsule recognition arrangement being arranged to identify the type of the capsules that are being used.

Indeed, when different capsule types are likely to be used in the same extraction unit, it is not sufficient to count the number of extraction processes carried out to derive the remaining capsule stock. The types of capsules should be identified by the machine so as to provide a differentiated management system aligned to the different capsule types.

Figures 2A, 2B:
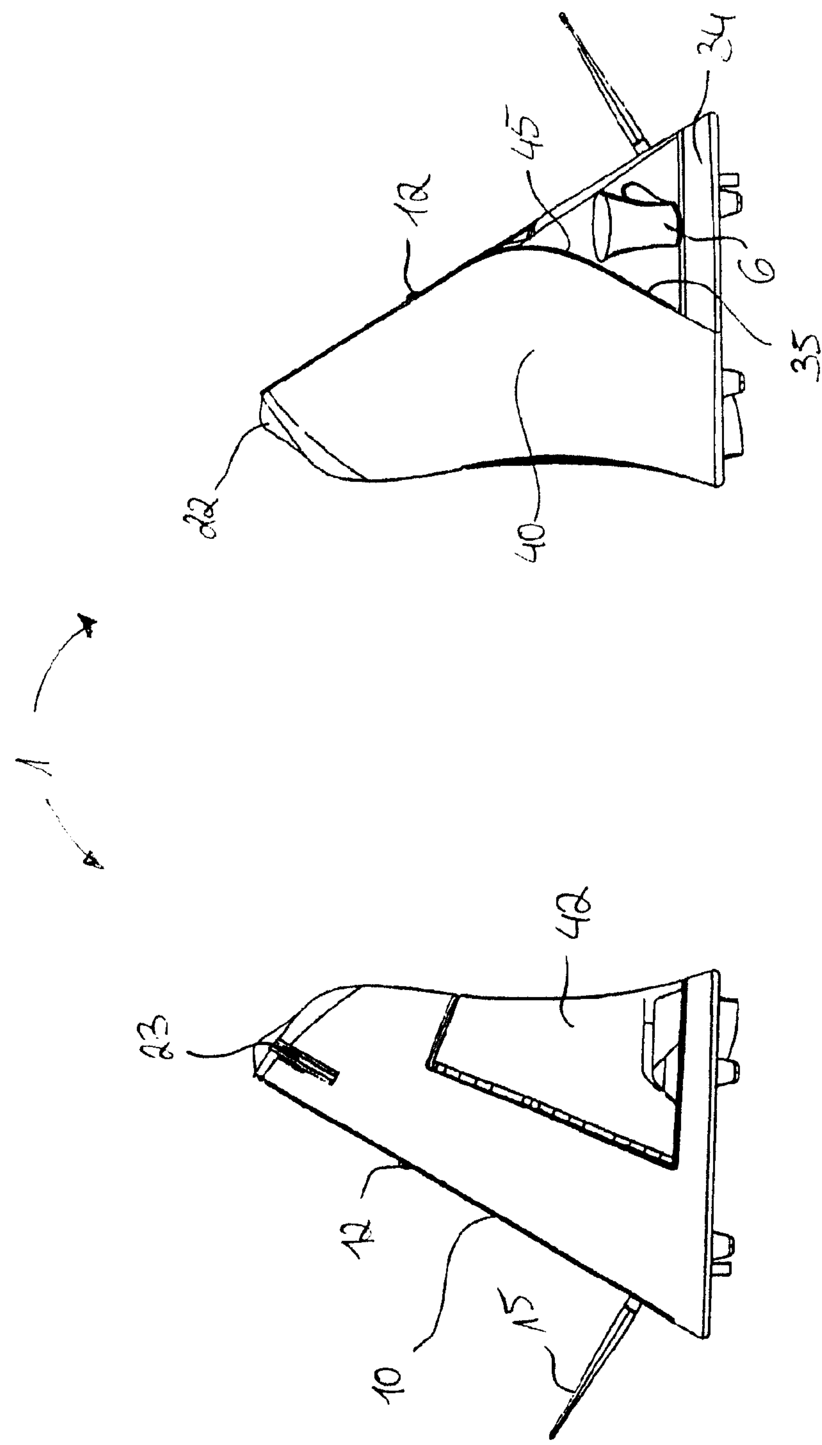

In the following with reference to FIGS. 1*a*, 1*b*, 2*a* and 2*b* the beverage preparation machine 1 according to the present invention and its basic functionalities will be described. Hereby, FIG. 1*a* is a perspective top view of the beverage preparation machine 1, FIG. 1*b* is a perspective bottom view, FIG. 2*a* is a side view on a first side of the beverage preparation machine 1 and FIG. 2*b* is a side view on the second side of the beverage preparation machine.

In the following the machine 1 will be described as coffee preparation machine, however, it is noted that the present invention is not limited to a coffee preparation machine but comprises any other type of beverage preparation machine as previously explained.

The machine 1 has an arrangement 40 for processing one or more beverage ingredients to dispense a beverage, such as coffee. Arrangement 40 includes a reservoir 42 for liquid, preferably water, connected to a liquid circulation circuit with a pump, a heater and a coffee brewing unit, as known in the art. The brewing unit can be connected to a handle 4 pivotally mounted at the housing 3 of the machine 1. The handle 4 is arranged to allow introduction, extraction and removing of a capsule containing a ground coffee. Upon extraction, capsules are evacuated to a used capsule collector after activating the handle 4 again.

Additionally, machine 1 has a top portion 36 which may be used for holding spare cups. Top portion 36 may include a heating arrangement to preheat such spare cups. The cup heater may be of the resistive type, in particular a vapour circulation cup heater as known in the art, or any other suitable heating system. A spare capsule receptacle may also be located on top portion 36 of machine 1 for storing unused capsules.

Moreover, machine 1 has an outlet 45 from which the prepared beverage is dispensed into a receptacle or cup 6 placed underneath the outlet 45, as shown for example in FIG. 2*b*. A drip tray arrangement 34 is provided under outlet 45, for instance of the type disclosed in EP 1731065. For positioning cup 6 under outlet 45, drip tray may include a positioning arrangement at its surface 14 and/or walls 35 delimiting dispensing cavity may be positioned relative to outlet 45 to serve as references for a cup positioning, i.e. so that a cup 6 may simply be pushed against walls 35 to be properly positioned under outlet 45. Also provided is a used capsule collector (not shown in the Figures) in a central part of machine 1 for collecting used, extracted capsules.

The machine further comprises a screen or display 10. Preferably, the display 10 is a touch sensitive screen and may be operated by finger contact and/or with a stylus 15. Preferably, the stylus 15 when not being used can be placed into a corresponding recess 16 within the display 10 or any other part of the machine 1.

Furthermore, display 10 is associated with a pair of buttons 12, for example for quick operation of machine 1 without having to access display 10. Moreover, in a preferred embodiment, display 10 includes a touch sensitive surface for navigating through pages and menus displayable on display 10.

Display 10 may be arranged to display various information and/or visual effects, as for example mentioned above, including network information when the machine is connectable to a user-network. Moreover, machine 1 may include a sound generating arrangement with loudspeakers and/or microphone and be a true multimedia interactive device, as discussed above. The machine 1 thereby may be used to contribute to the ambience.

In addition to display 10 and/or housing 3 may in particular have a series of holes 31 on its lateral, rear and/or upper sides, in particular within display 10, for the emission of light, of various colours, to create such an ambiance. For this purpose LEDs of various can be provided within the holes 31.

Unlike prior art beverage preparation machines, drip tray 34, capsule receptacle and reservoir 42 are removable from the machine 1, in a movement underneath the display 10 and that goes away from display 10 and/or generally parallel to the foot portion 2 of the machine 1. The same applies to reservoir 42, which preferably is provided at the back of the machine beyond the display 1. It follows that during use and after use, when the machine is serviced, e.g. drip tray 34 emptied, display is not exposed to parts of machine 1 that might project liquid, such as liquid food or beverage, against screen 10.

Furthermore, machine 1 has a capsule inlet arrangement 32 for the supply of capsules containing an ingredient of the liquid food or beverage to be prepared, such as coffee. The capsule inlet arrangement 32 can be either provided on the lateral side of the machine or can be provided within the display 10. Preferably, the capsule inlet arrangement 32 is a recess within the display 10 having the shape of a capsule or any other object related to the prepared beverage.

The display 10 of the machine has not an entirely flat surface but on one side when approaching the foot portion 2, provides a recess. The recessing walls 35 of the display 10 together with the cup support 14 of the drip tray 34 thus provide a cavity 16 into which the cup 6 can be placed to be filled with the beverage dispensed from the outlet 45. To deemphasize the liquid food or beverage visual aspect of machine 1, the walls 35 of the display 10 within the cavity 16 can be used like a normal display, so that every object and/or image displayed on the display 10 extends into the cavity walls 35.

On the top portion 26 or on any other part of the machine, a touch sensor 22 can be provided enabling the user to control the machine and/or to navigate through the menu functions by carrying out a corresponding touch operation on the touch sensor 22. In case that the display 10 is a mere display and not a touch screen, the touch sensor 22 will make the control of the machine easier and more intuitive for the user. In case that the display 10 is a touch screen, then the user has the choice whether to use the display 10 or the touch sensor 22 for carrying out the touch operation. However, it might be advantageous to use the touch sensor 22 instead of the touch screen to avoid damage or contamination on the display 10.

The machine 1 can further comprise a card reader/writer 23. The card reader/writer 23 can either be a slot, into which a card can be inserted to carry out a reading and/or a writing operation on the card, the card reader/writer 23 can be a wireless interface enabling a wireless communication with a card, e.g. a radio frequency identification RFID card, or a combination thereof.

In order to provide an adjusted filling of the cup, an automatic filling system with a control of the level of fill may be implemented into the machine, for instance of the type disclosed in U.S. Pat. No. 4,458,735, WO97/25634 and WO99/50172.

Figure 3:
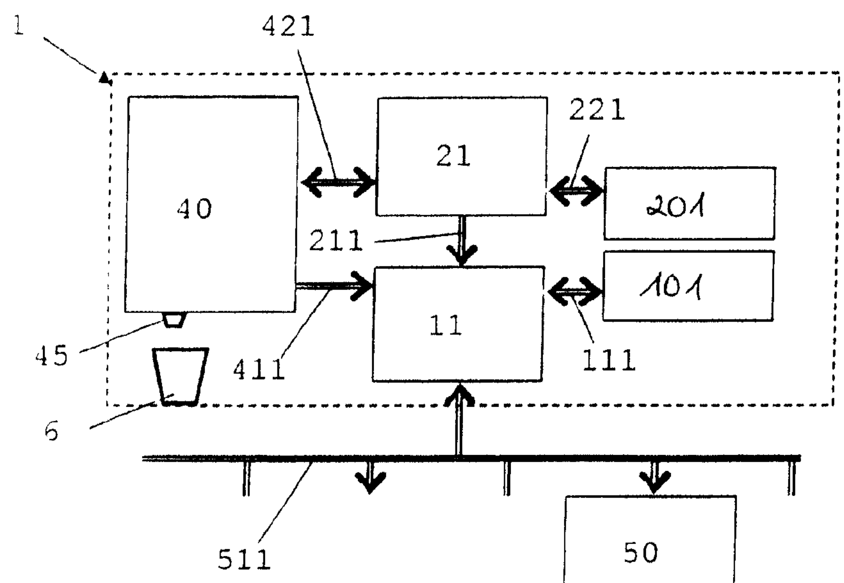
FIG. 3 shows a block diagram showing schematically the functional architecture of a beverage preparation machine according to the present invention being connected to a network.

FIG. 3 shows a functional block diagram of a beverage preparation machine 1 according to the present invention which is connected to a network 511.

Beverage preparation machine 1 includes a control unit 21 connected to a user-interface 201 via a bi-directional data communication channel 221. Control unit 21 is connected to the ingredient processing arrangement 40 for controlling the processing of the beverage ingredients. Typically, control unit 21 will control the powering of a heater and a pump and adjust the powering based on measured parameters of the beverage preparation process via sensors, such as temperature sensors, pressure sensors and flowmeters. Moreover, the control of the components of the ingredient processing arrangement 40 may be adjusted to the type of ingredient capsule extracted upon automatic recognition thereof via a capsule recognition system as known in the art, for instance an electromagnetic, mechanical, colour or barcode recognition system.

Hence, ingredient processing arrangement 40 includes a series of sensors for returning information to control unit 21 relating to the state of arrangement 40 and of the beverage preparation process. Communication between control unit 21 and beverage preparation 41 is achieved via a bidirectional communication channel 421.

Furthermore, beverage preparation machine 1 has a communication module 11 for bidirectional communication with an external network 511, such as the internet or an intranet. Communication module 11 is connected to a user-interface 101, preferably in the form of the above mentioned display 10, preferably a touch screen, and possibly one or more buttons 12, via a bidirectional data communication channel 111. Display 10 in case of a touch screen may be operated by finger touch or by way of the stylus 15.

Control unit 11, communication module 21 and ingredient processing arrangement 40 are all contained within the housing of beverage preparation machine 1.

In accordance with the invention, communication module 11 is permanently prevented from controlling the processing of the beverage ingredients. In other words, communication module 11 of beverage preparation machine 1 may not act directly or indirectly via control unit 21 on arrangement 40 or affect the beverage preparation process or other processes carried out by arrangement 40.

Control unit 21 is prevented from accepting beverage preparation-related control data from communication module 11.

In the architecture of FIG. 3, the control unit 21 is arranged to communicate data to communication module 11 via unidirectional data communication channel 211. With the exception of a request for information and the signals necessary to ensure proper communication, e.g. data transmission control signals, control unit 21 will not receive any data from communication module 11. Conversely, the data transferred from control unit 21 to communication module 11 may relate to at least one of: the beverage preparation process; ingredient processing arrangement 40; beverage preparation settings stored in control unit 21; and/or the state of control unit 21, e.g. in the view of identifying any malfunctioning at a station 50 remotely connected to network 511.

It is also possible to connect communication module 11 directly to the sensors in the beverage preparation module 40. Likewise, communication between beverage preparation module 40 and communication module 11 is unidirectional via bus 411. However, this communication channel may become redundant if the data relating to the beverage preparation module 40 can be communicated to the communication module 11 via control unit 21. Communication channel 411 is particularly useful in the absence of communication channel 211, for instance when the control unit 21 should benefit from an increased protection against network 511.

Communication module 11 is arranged to receive from said network and communicate via user-communication interface, such as display 10 and/or loudspeaker, information relating to at least one of: a need to carry out a particular service, e.g. descaling; a need to repair said machine; and information on a particular ingredient that is being processed in said machine. For such information to be sent to communication module 11, corresponding information is first gathered together by communication module 21 from control unit 21 and/or ingredient processing arrangement 40 and sent to a remote server 50 that processes and analyses the information before returning, when appropriate warnings or other information to communication module 11 via network 511.

In another embodiment, control unit 21 is prevented from communicating at all with communication module 11, not even unidirectionally. There is no data communication channel between control unit 21 and communication module 11.

The highest degree of safety is achieved when communication module 11 is connected neither to control unit 21 nor to beverage preparation module 40. A slightly inferior protection is achieved when communication module 11 is allowed to read, via a unidirectional channel, sensors of beverage preparation module 40. A still lower safety is obtained when communication module is allowed to obtain information from control unit 21. To ensure immunity against any upsetting of ingredient processing arrangement 40 and the control unit 21 via network 511, the possibility, in particular any physical possibility, for communication module 11 to change parameters of the control unit 21 or beverage preparation unit 40 should be avoided.

As shown in FIGS. 1*a* and 1*b* beverage preparation user-interface 201 is flush with communication user-interface 101 and implemented as a combination of display 10, buttons 12, holes 31 comprising LEDs or the like, loudspeakers, microphones or the like. A master switch for the machine 1 is also provided (not shown in the Figures). The master switch is arranged to connect and disconnect the powering of the various components of the beverage preparation machine, including communication module 11, control unit 21 and ingredient processing arrangement 40 all powered by the same power source, typically the mains.

Generally, communication module 11 can be arranged to receive from the network 511 and communicate via user-communication interface, such as a display 10 and/or loudspeaker, information relating to: handling of such machine 1 by a user; advertising relating to such machine 1 or related machines, accessories, and/or one or more ingredients for the beverage processing; general information relating to one or more ingredients for the beverage processing; visualization and/or music for generating an ambiance relating to said beverage or preparation thereof or consumption thereof; and news and/or weather forecast.

Figure 4:
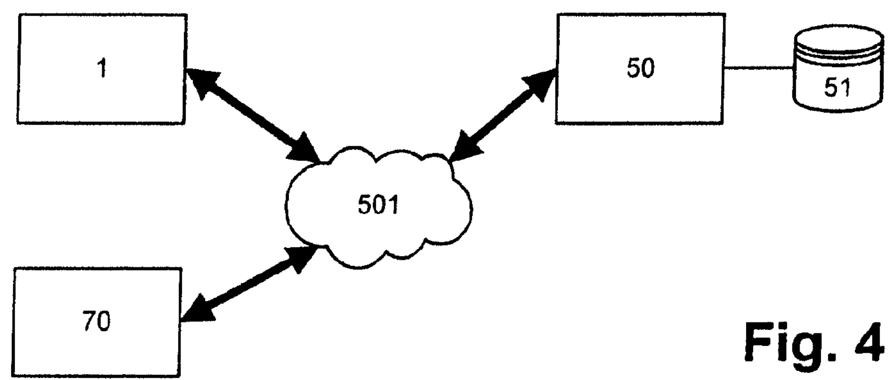
FIG. 4 shows a block diagram showing schematically the functional architecture of a network comprising a beverage preparation machine according to the present invention.

FIG. 4 shows a network comprising a machine 1 according to the present invention having network capabilities. Connected to the communication network 501 is also a server 50, which for example can be associated to a capsule supplier. The server 50 can be further connected to a database 51 comprising data on users, capsules, machines, capsule consumption or the like.

A user device 70 can further be connected to the network 501. Such a user device 70 can for example be a notebook, PC, mobile phone, PDA or any other user device having network communication capabilities.

Via the user device 70 the user can for example submit data, programs or information to the machine 1. For example he can load new or updated software or data into the machine 1. He can also change the settings of the machine remotely. Depending on the degree of communication possibilities between the control module 21 and the communication module 11, the user can also remotely start, stop or change a beverage preparation process. The user via the user device 70 can also log into the server 50 in order to change his personal user configurations, to submit a capsule order, to send a request for support or information or the like.

Even though in FIG. 4 the network 501 is shown as one single network connecting the machine 1, the server 50 and the user device 70, it is also possible that the different devices communicate via one or more separate network. Any type of network can be possible including a public or a private network, for example via bluetooth, infrared, GSM, UMTS, internet or any other type of wired or wireless communication network. Specifically, an intermediate device such as a telemetry device can be provided between the machine 1 and the network 501 in order to convert the corresponding data which are transmitted. The communication between respectively two of the devices, i.e. the machine 1, the server 50 and the user device 70 can be one- or bidirectional.

The present invention relates to a method for ambiance emulation by a beverage preparation machine as well as to a beverage preparation machine with ambiance emulation functionality.

Figure 5:
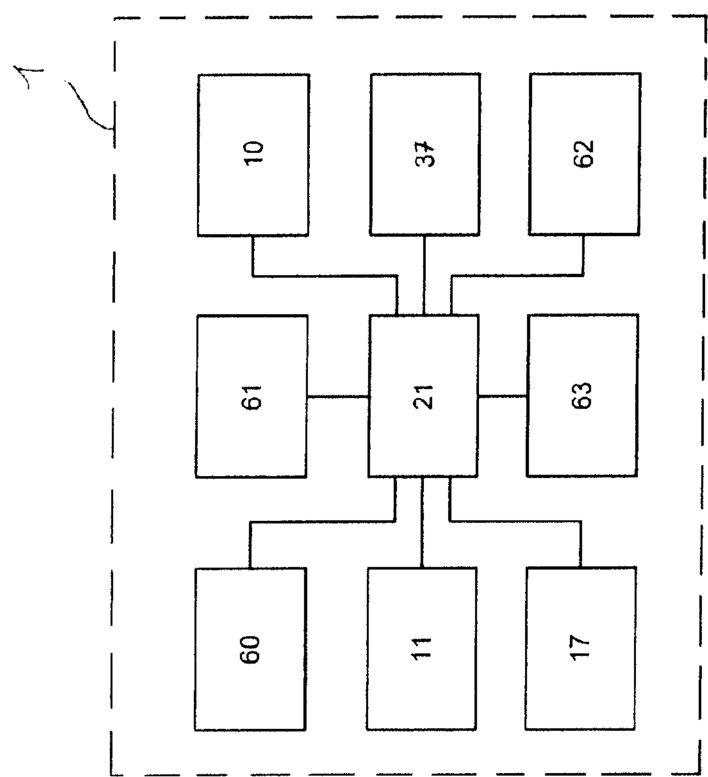
FIG. 5 shows a further block diagram showing schematically the functional architecture of a beverage preparation machine according to the present invention being connected to a network.

The beverage preparation machine in addition to the previously described components such as an arrangement 40 for processing one or more beverages, a display 10 optionally with integrated LEDs and the like can also comprise further components, as will be explained with reference to FIG. 5, which shows a further block diagram with a functional architecture of the machine 1 according to the present invention.

The machine 1 comprises a control unit 21, a display 10, which is preferably a touch screen, and a communication module 11 enabling a communication with at least one further device via a communication network.

The machine 1 according to the present invention also comprises a storage 17, in which data, programs or any other type of information can be stored. The storage 17 can be a single storage or can comprise several storage parts of the volatile and/or non-volatile memory type. The machine 1 can also comprise an internal clock 37, which constantly provides information on the actual date and/or time. Alternatively, the actual date and time information can also be received via the communication module 11 from an external device via the communication network 501, 511.

The machine may further comprise a camera 62 for taking still images and/or video sequences from the surrounding of the machine. The camera 62 can be static or can be movable with respect to the machine 1, so that the orientation of the camera can be changed. Integrated into the camera 62 there can be a movement detection functionality for detecting movements in the surrounding and consequently for detecting the presence of a user.

There can be further provided a microphone 60 and/or loudspeakers 61. The microphone can either be only adapted to receive music, spoken words or any type of sound or it can be also adapted for voice recognition, so that for example the input of spoken commands into the machine 1 is possible. The loudspeakers 61 can be any type of known loudspeakers adapted to output any kind of sound, music or the like.

The machine 1 can also comprise one or more sensors 63 integrated into the machine 1 for recognizing the type of prepared beverage, preferably by means of a coded capsule. As already described, the sensors can be adapted to submit this information to the control unit 21 and/or directly to the communication module 11 for submission to an external device via the communication network 501, 511.

The present invention provides an ambience emulation functionality by adapting reproduced data, such as visible content or audible and visible content, to the actual situation, e.g. for example to the actual surrounding area or the type of prepared beverage.

For this purpose, data are provided containing visible and possibly also audible content, which upon reproduction generate, i.e. emulate, a predefined ambience. Hereby, preferably, such data are provided by storing them in the machine's memory 17, but it is also possible to provide such data from a remote device via an external network and the communication module 11.

The provided data in any case are linked to context information. Said context information indicate situation. For emulating ambience, the actual context information is acquired which indicate an actual situation. This actual context information is compared to the context information to which the data are linked and then the one or more data, which are linked to the actual context information are selected for reproduction.

Thereby, a context oriented reproduction of audible and/or visible data becomes possible, so that depending on predefined settings the actual ambience is either intensified or weakened.

The context information according to the present invention is hereby intended to refer to information which does not indicate the actual status of the machine or other machine related parameters. The context information rather refers to a situation, which is beyond the basic functionality of the machine, such as sound, color shade, brightness or the like of the surrounding area, current time and date or the like. The context information thus refers to a secondary context of the machine and not to the primary technical context comprising machine parameters such as temperature, water level, pressure, any parameters related to the brewing process and so on.

Consequently, the data which are reproduced for creating a predefined ambience, comprise no status information of the machine, such a indications of malfunctions or missing ingredients, but rather are data derived from other features, such as images, graphics, sound and so on.

Figure 7:
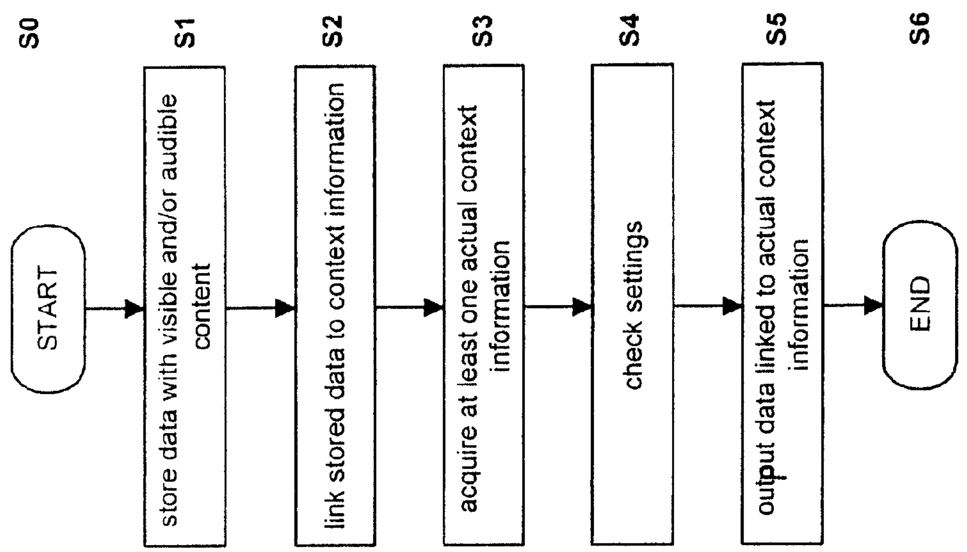
FIG. 7 is a flowchart showing the process steps of the method according to the present invention.

The method of the present invention will be explained in more detail with reference to FIG. 7, which is a flow chart showing the process steps of the present invention.

The process starts in step S0.

In step S1 data are provided, preferably stored in the storage 17. Hereby, it is of course also possible that the process starts at a point where the data are already stored in the storage 17.

Such data may comprise visible content, such as graphical data. The graphical data can be still images, an image sequence, an animated image and/or text or a combination thereof. The graphical data preferably are colored graphical data; however the use of a grey scale or black and white graphical data is also possible. Such data may alternatively or additionally comprise audible content, such as music, artificial sound, natural sound and/or spoken text.

In the next step S2, if not yet done, the stored data are linked to context information. Again it is to be noted that this step can also be accomplished prior to powering the machine on, so that the data are readily stored and linked to context information.

Said context information is for example at least one of presence of a user, date, time, color shade of the surrounding area, brightness of the surrounding area, type of sound in surrounding area and/or type of prepared beverage.

However, the present invention is not limited to the above-mentioned context information but can comprise any other context information indicating a situation. However, the context information does not indicate a functional status of the machine 1 itself.

In the next step S3 at least one actual context information indicating an actual situation is acquired.

For acquiring the actual context information the machine 1 comprises an acquisition arrangement, which can comprise one or more of the following components: an internal clock 17 indicating the actual date, time and/or season of the year, one or more sensors 63 for identifying the type of prepared beverage, a camera 62 for taking an image of the surrounding area in order to detect the color shade and/or brightness of the surrounding area and environment, a microphone 60 for detecting voices, sound and/or music and/or any other type of sensors for detecting the surrounding ambiance, e.g. the brightness and the color shade. The camera 62 can also be adapted to detect present of a user. The communication module 11 for communicating wirelessly or in a wired manner with one or more external devices can also acquire information on the actual status from an external device. Such external devices may be external storages, external clocks, external sensors, cameras or the like.

In the next step S4, which is optional, the settings of the machine are checked. It is for example checked, which acquired actual context information should be used for deciding which data to display. More concretely, if actual context information are acquired from more than one component of the acquisition arrangement, e.g. the actual date and time together with the actual color shade and brightness of the surrounding area, then dependent upon the settings it can be decided, whether only one context information should be used and the other context information should be discarded, whether two or more context information should be used for deciding which data to reproduce, whether for each different context information different data should be reproduced consecutively or the like. It is also possible to reproduce a visible content together with an audible content at the same time.

The settings can also foresee that the ambiance emulation functionality is only started upon detection of presence of a user. These settings can either be automatically set or it can be possible for the user to change the settings.

In the next step S5 the actual context information is compared to the context information to which the stored data are linked and then those data are displayed on the reproduced, which are linked to the actual context information for generating an ambiance related to the actual status.

The process ends in step S6.

In the following several examples of context information and the corresponding reproduced data are given.

If for example an internal clock 17 or external clock is read out, then based upon the clock value the actual time of the day can be determined, for example morning time, afternoon or evening time. Depending on the time of the day then data are reproduced generating an ambiance corresponding to the time of the day. For example, in the morning a sun and very bright colors, such as yellow or the like, can be used to generate a bright and stimulating display image. In the evening for example darker colors such as blue can be used. Hereby, either an abstract image can be shown or an image or symbols related to the actual time of the day can be displayed, for example a sun in the morning and/or a moon and stars in the evening. Together with or alternatively to reproduction of visible data on the display 10, also audible data corresponding to the actual time of day can be reproduced by the loudspeakers. In the morning for example fast and stimulating music can be reproduced, or any type of sound which is usual in the morning such as birds or the like.

In case that from the read-out clock a specific date is determined and if data are provided which are linked to a date, then also a corresponding entry within the agenda of the user can be read out and data can be reproduced generating an ambiance corresponding to the entry in the agenda of the user. In case of visible data this may be for example an image and/or text reminding the user of a specific event, for example a birthday of a friend or relative. Hereby, such graphical can be displayed automatically; i.e. every time for example a specific event such as a birthday or the like is detected in the agenda, then a corresponding text is displayed. Alternatively or additionally, the user or any other person can input a specific text or sort of post-it, which is then shown on the display on the specific day. In addition to or alternatively to graphical data shown on the display it is also possible to reproduce audible data corresponding to the entry in the agenda or generally corresponding to the present date. During Christmas time for example Christmas themes can be played independently of the entry within the agenda of the user.

In case that upon the read-out value from the clock a specific month and/or season within the year is determined, then data generating an ambience corresponding to the season of the year can be reproduced. For example, in the season of autumn, graphical data with autumn colors such as yellow, red and orange can be displayed and/or an image of a landscape or any other location in autumn can be shown.

The data can be linked to a different color shade and/or brightness. In this case via the camera 62 or a corresponding sensor an image of the surrounding area of the machine is taken and/or the parameters such as color and brightness of the surrounding area are measured by the sensor and then data are displayed generating an ambiance corresponding to the surrounding area. If for example the surrounding area is dark, then also graphical data can be displayed having rather darker colors. Alternatively, in order to provide a counterpart to a dark surrounding area, in this case also very bright colors can be displayed. With the data it is thus possible to either intensify or to weaken the actual ambience (which can again be dependent on the settings).

The machine can further comprise one or more sensors for identifying based on any type of parameters the actually prepared type of beverage. In a preferred embodiment, the beverage preparation machine 1 has an automatic capsule recognition arrangement. For example, the capsule recognition arrangement is of the type disclosed in WO02/28241, which discloses a coffee machine using capsules with a machine interpretable feature that can be read-out automatically by the machine via a sensor. The machine interpretable feature on the capsule may include one or more of a color, a shape, a glyph, a text string, a barcode, a digital water mark, symbols, notches, grooves or holes.

The data can for example contain visible information on the actually brewed beverage. In the case of coffee for example, the name of the actual coffee, the strength, the roasting degree or any other information can be displayed. It is also possible to display information regarding the preparation of the beverage. If for example a coffee is currently brewed, which can be used for preparing a beverage including coffee and milk, then an indication can be displayed indicating the different steps including brewing of coffee, addition of milk or the like.

It is also possible that the machine 1 via a microphone 60 acquires actual sound and/or voices and selects data to be reproduced depending on these detected sounds. If the user is for example humming a predefined melody, this melody can be recognized and the corresponding song can be reproduced. Additionally, either the single cover or album cover of the respective song can be shown on the display 10 or any other type of image having a relation to the played song.

With reference to FIGS. 6*a* to 6*d* now different examples of graphical data will be explained.

Figure 6A:
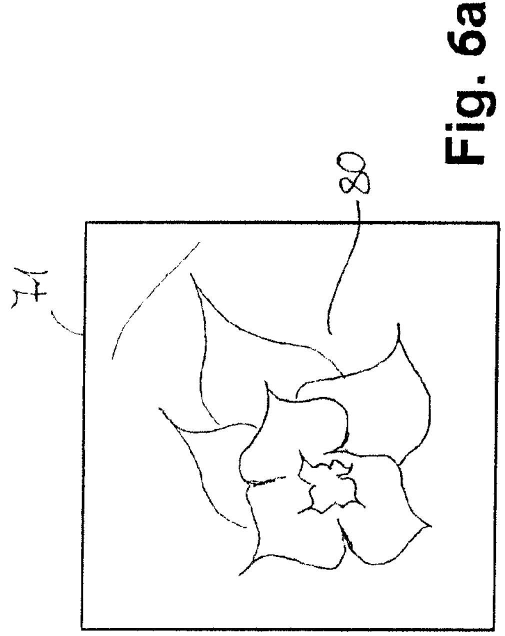
FIGS. 6*a* to 6*d* are different embodiments of display images according to the present invention.

In FIG. 6*a* a display image 71 is shown with an abstract image 80 thereon. The abstract image can be a still image or an animated image or any type of image sequence as for example used for screen savers, whereby the image can also change color and shape. Such an image can for example be displayed after having acquired information on the current surrounding so that the image can be adapted to the surrounding.

Figure 6B:
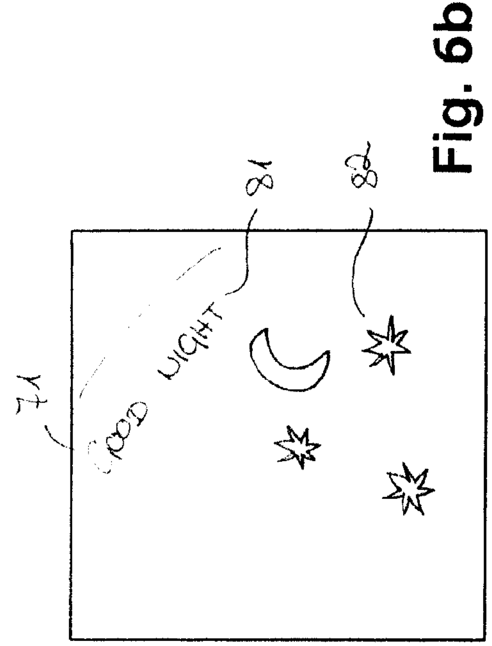

In FIG. 6*b* an example is shown, where graphical data are displayed depending on the actual time of the day. In the present example the actual time of the day is evening and correspondingly the data generate an ambiance related to evening or night. In the present example a message 81 for example "good night" is displayed and a corresponding image, for example stars and moon 82, can be shown.

Figure 6C:
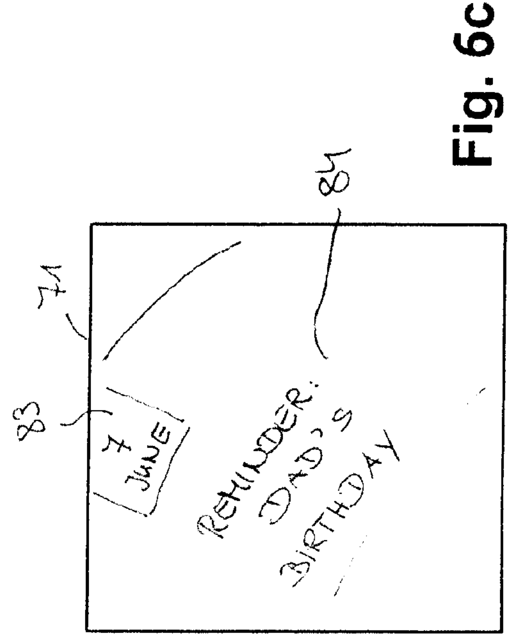

FIG. 6*c* shows an example, where the data are linked to a specific date and depending on an entry in the agenda of the user a reminder on an event is shown. In this example in a date field 83 the actual date, for example June 7, is shown, and a text message 84 is shown reminding the user of the event, for example a reminder for the birthday of the father of the user.

Figure 6D:
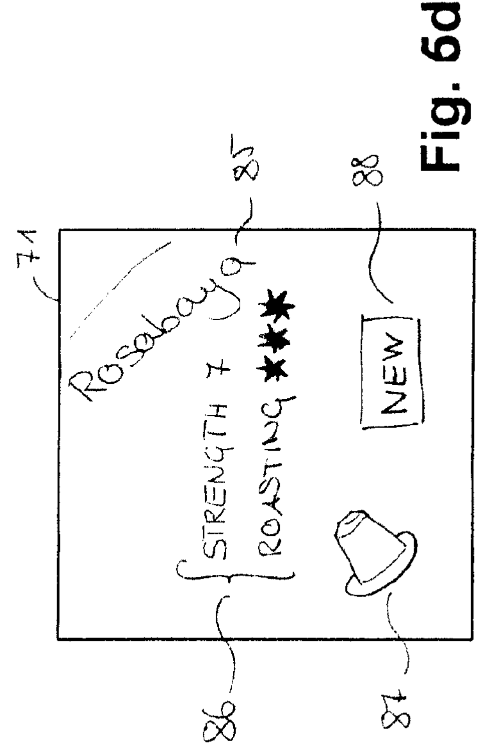

In FIG. 6*d* the example is shown, where the graphical data are linked to the type of prepared beverage. In this specific example, a coffee is prepared and the machine comprises the previously explained capsule recognition system, so that the machine can display graphical data indicating information on the actually prepared beverage. The name 85 of the coffee can be displayed, for example "Rosabaya", information 86 on the coffee can be shown, indicating for example the strength, the roasting or the like, an icon 87 can be shown indicating the type of capsule and possibly other information 88 related to the currently prepared beverage can be displayed, in the present case for example an indication that the presently prepared coffee is a new one.

With the present invention thus a very elaborated ambiance emulation can be provided, since one or more parameters of the actual situation can be acquired and the display and/or the loudspeakers can reproduce a corresponding content, which can either create an ambience, intensify or weaken the actual ambience.

The invention claimed is:

1. A beverage preparation machine with ambience emulation functionality, the machine comprising:

a reservoir for a liquid;

a mechanism to allow introduction, extraction and removal of a capsule containing a beverage ingredient;

a providing arrangement for providing data with visible content for generating a predefined ambience when reproduced, the provided data linked to context information selected from the group consisting of a color shade of a surrounding area, a brightness of the surrounding area, and combinations thereof;

an acquisition arrangement for acquiring at least one actual context information indicating an actual situation; and a display that reproduces data associated with the acquired actual context information to generate an ambience related to the actual situation.

2. The machine of claim 1, wherein the acquisition arrangement comprises:

an internal clock providing a data selected from the group consisting of date and time;

a camera for taking an image of the surrounding area;

a microphone for detecting a signal selected from the group consisting of sound and spoken language; and a sensor for identifying the type of prepared beverage.

3. The machine of claim 2, wherein the sensor is adapted to identify the prepared beverage using a coded capsule.

4. The machine of claim 1, wherein the providing arrangement comprises a memory for storing the data with visible content.

5. The machine of claim 1, wherein the providing arrangement is adapted to provide as visible data graphical data an image selected from the group consisting of still images, an image sequence, an animated image and text.

6. The machine of claim 1, wherein the providing arrangement is adapted to provide data with visible and audible content and to provide as audible a sound selected from the group consisting of data music, spoken text, artificial sounds and natural sound.

7. The machine of claim 1, wherein the acquisition arrangement is adapted to acquire the actual context information by a technique selected from the group consisting of:

reading out an internal clock, taking an image of the surrounding area by using a camera and analyzing the image with respect to a characteristic selected from the group consisting of colour shade and brightness, detecting the presence of a user by use of the camera, detecting a signal selected from the group consisting of sound and spoken language by use of a microphone, and identifying the type or prepared beverage by use of a sensor.

8. The machine of claim 1, wherein the providing arrangement is adapted to provide data linked to an agenda of the user; and data are reproduced generating an ambience corresponding to the entry in the agenda.

9. The machine of claim 1, wherein the providing arrangement is adapted to provide data linked to different types of beverages; and data are reproduced including information on the type of prepared beverage.

10. The machine of claim 1, wherein the acquisition arrangement comprises a sensor for identifying the type of capsule, and data are reproduced including information on the type of the capsule.

* * * * *